US010948993B2

(12) United States Patent
Alexander (10) Patent No.: US 10,948,993 B2
(45) Date of Patent: Mar. 16, 2021

(54) PICTURE-TAKING WITHIN VIRTUAL REALITY

(71) Applicant: Facebook, Inc., Menlo Park, CA (US)

(72) Inventor: Alexandros Alexander, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/002,365

(22) Filed: Jun. 7, 2018

(65) Prior Publication Data

US 2019/0377416 A1    Dec. 12, 2019

(51) Int. Cl.
*G06F 3/01*     (2006.01)
*G06F 3/0481*   (2013.01)
*G06K 9/00*     (2006.01)
*G06T 19/00*    (2011.01)

(52) U.S. Cl.
CPC .......... *G06F 3/017* (2013.01); *G06F 3/04815* (2013.01); *G06K 9/00355* (2013.01); *G06T 19/006* (2013.01)

(58) Field of Classification Search
CPC ... G06F 3/017; G06F 3/04815; G06T 19/006; G06K 9/00355
See application file for complete search history.

(56) References Cited

U.S. PATENT DOCUMENTS

| 2013/0194295 | A1* | 8/2013 | Chan ................... G09G 3/3466 345/619 |
| 2016/0203360 | A1* | 7/2016 | Alvarez ............. G06K 9/00355 345/156 |
| 2016/0343173 | A1* | 11/2016 | Mullins .................. G06F 3/011 |
| 2017/0013188 | A1* | 1/2017 | Kothari ............... B60R 11/0235 |

* cited by examiner

*Primary Examiner* — Mark W Regn
(74) *Attorney, Agent, or Firm* — Baker Botts L.L.P.

(57) ABSTRACT

In one embodiment, a method includes a computing system receiving hand configuration data associated with a user of an artificial reality application. The system may determine, based on the hand configuration data, that two fingers of a virtual left hand and two fingers of a virtual right hand of the user are extended. The system may determine that those fingers define a quadrilateral in a virtual environment, with the two fingers of the virtual left hand defining a first corner of the quadrilateral and the two fingers of the virtual right hand defining an opposite corner of the quadrilateral. The system may generate, based on the quadrilateral and a viewpoint of the user in the virtual environment, an image that captures a scene in the virtual environment. The system may then display the generated image in the virtual environment.

19 Claims, 10 Drawing Sheets

PICTURE-TAKING WITHIN VIRTUAL REALITY

TECHNICAL FIELD

This disclosure generally relates to virtual reality, and in particular to a user interface for taking pictures within virtual reality.

BACKGROUND

Virtual reality (VR) is a computer-generated simulation of an environment (e.g., a three-dimensional or 3D environment) in which users can interact with virtual objects in a seemingly realistic way. The simulation may include images, sounds, haptic feedback, and/or other sensations to provide users with a realistic perception of an immersive virtual environment. The virtual environment may be visually presented to users through a head-mounted display unit, which may include a display screen and optical lenses. Users may interact with virtual objects within VR through motion sensors and/or hand-held controllers.

Certain VR applications may support picture-taking in virtual reality. For example, while a user is immersed within a VR environment, the user may wish to take a picture of a VR scene. To do so, a user typically would need to select a virtual camera tool (e.g., via a menu selection), retrieve the virtual camera (e.g., by motioning to pick up or take out the virtual camera as a person would in the real world), aim the virtual camera at the desired scene, and take a picture of the scene. This sequence of movements is akin to how a person would take a photograph in the real world. Although the movements may be familiar users, it is nevertheless cumbersome and time consuming. For VR devices whose input device are hand controllers, requiring users to perform a series of complex movements using unfamiliar hand controllers may introduce an additional degree of difficulty for users to perform the simple task of taking a picture.

SUMMARY OF PARTICULAR EMBODIMENTS

Particular embodiments described herein provide an improved user interface that enables users to take pictures within a VR environment quickly and intuitively. In contrast to conventional systems that require a user to navigate a sequence of menus and/or fumble for a picture-taking tool (e.g., a virtual camera), embodiments described herein allow a user to take pictures by gesturing in an intuitive and functional manner. For example, a user may take pictures of a VR scene by positioning his/her fingers (and the corresponding virtual fingers in VR) in a manner that frames the scene of interest. For example, the user may frame the scene of interest with his/her extended index fingers and thumbs. Once the desired scene has been framed in this manner, the user may press a button (or perform any other type of input command) to instruct the system to take a picture of the framed scene.

Embodiments of the VR picture-taking user interface allow a scene to be quickly framed and captured, eliminating the tediousness of conventional picture-taking methods in VR. Rather than going through the process of navigating through a menu, producing a virtual camera, aiming the camera, and only then taking a picture, users of the picture-taking embodiments described herein could simply frame the desired scene with his hands and take a picture. By simplifying the picture-taking process, the VR picture-taking user interface reduces the latency between when the user wishes to take a picture and the time the picture is actually taken. The reduced latency in the picture-taking process allows users to more readily be able to capture desired moment (which is especially advantageous in VR environments with fast-changing scenes or moving objects). In addition, unlike conventional methodologies with fixed aspect ratios, the VR picture-taking user interface described herein allows a user to specify, at the time of picture taking, the desired aspect ratio based on his/her hand positions. This flexibility affords users with greater flexibility and reduces the need for post-capture image processing.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

While conventional artificial reality systems may provide picture-taking features, those features typically require the user to navigate through a tedious sequence of menu options. Other types of conventional systems may require the user to locate, produce, hold up, point, and actuate a virtual camera using the user's virtual hands in order to take a picture. Performing such actions may be especially challenging for users of artificial reality systems because the input devices of such systems are primarily designed for sensing coarse movements (e.g., arm, body, and head movements) and are less adept to sensing the fine movements that may be needed to perform the aforementioned action sequences. As a result, achieving the simple task of taking a picture using conventional systems is, ironically, difficult.

Figure 1A:
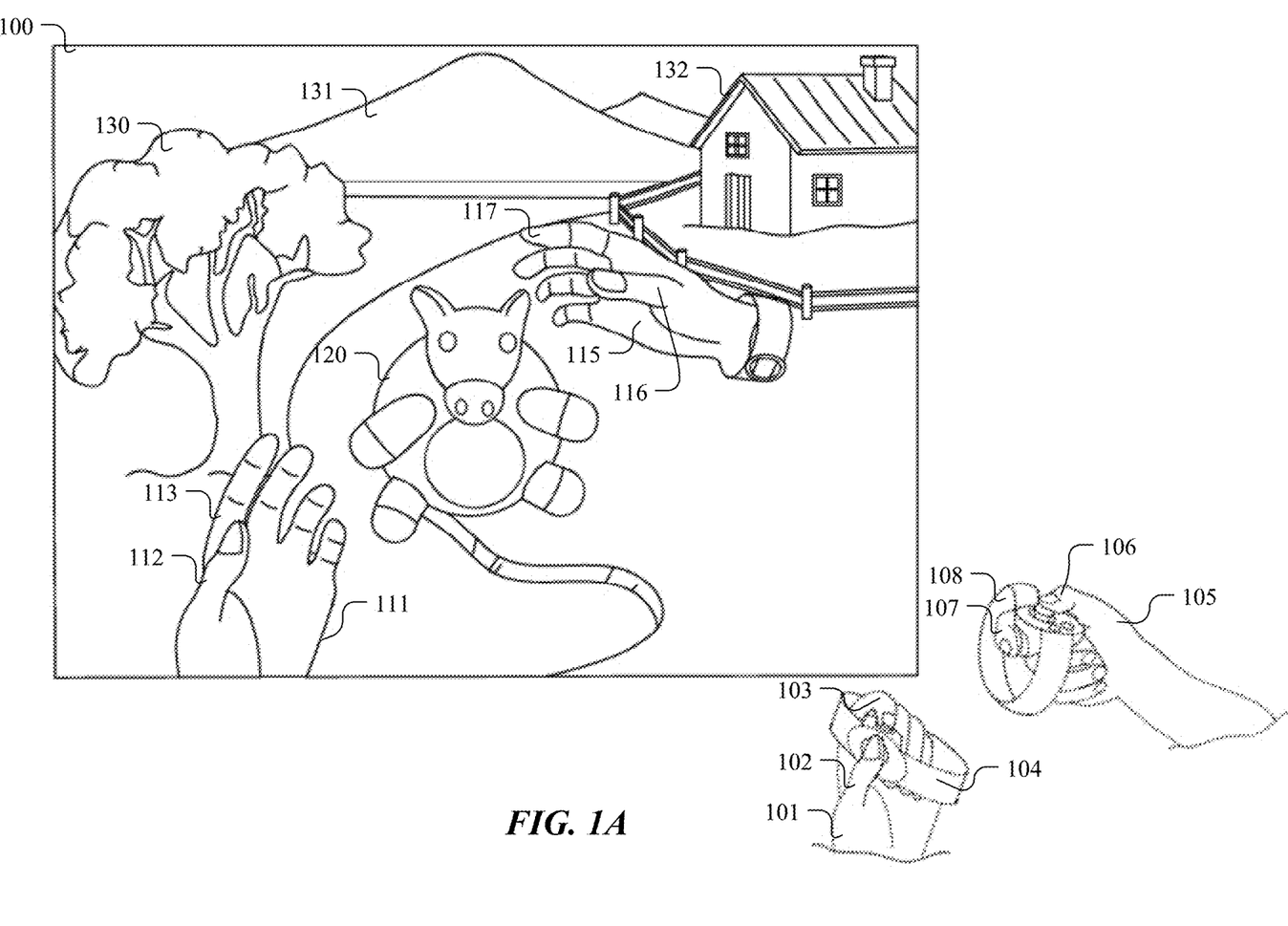
FIGS. 1A-1G illustrate an example of a user interface for taking pictures in artificial reality according to particular embodiments.

Embodiments disclosed herein enable a user of an artificial reality system to quickly and intuitively take pictures of what the user is seeing. FIGS. 1A-1G illustrate an example of a user interface for taking pictures in artificial reality, according to particular embodiments. FIG. 1A illustrates a scenario where the user is viewing a virtual environment 100 (which could be a portion of the larger environment) generated by an artificial reality system. The virtual environment 100 may include any number and type of computer-generated virtual objects, such as the virtual animal 120. In embodiments where the artificial reality system is a virtual reality system, the other objects shown in the environment 100, such as the tree 130, mountains 131, and house 132, would also be computer-generated virtual objects. In embodiments where the artificial reality system is an augmented reality system, some of the other objects shown may be physical, real-world objects (e.g., the mountains 131 and house 132 may be real and the tree 130 may be virtual), on which the virtual animal 120 is overlaid.

The user may view and interact with the virtual environment 100 using his hands 101, 105. In particular embodiments, the artificial reality system may provide users with hand-held controllers 104, 108. The positions and orientations of the controllers 104, 108 may be tracked by motion sensors, which may be based on, for example, infrared, magnetic field, accelerometer, optical sensor technology, or any other suitable motion-tracking technologies. The controllers 104, 108 may further have input mechanisms, such as buttons, touch sensors, trackpads, joysticks, etc., configured to receive input from a user's fingers. FIG. 1A shows the left controller 104 and right controller 108 being held by the user's physical left hand 101 and right hand 105, respectively. The user's left thumb 102 and finger 103 (while the index finger is shown, embodiments disclosed herein contemplate any of the other fingers to be used as well) is shown to touch, but not press, input mechanisms of the left controller 104. Similarly, the user's right thumb 106 and right finger 107 is shown to touch, but not press, input mechanisms of the right controller 108. The touching but not pressing state of the user's hands 101, 105 may be referred to as the "neutral state." In particular embodiments, when the user's hands 101, 105 are in the neutral state, the artificial reality system may render a corresponding virtual left hand 111 and a corresponding virtual right hand 115 that approximately reflect the current orientation of the user's physical hands 101, 105. For example, in FIG. 1A, the user's left hand 101 is positioned to the lower-left of the right hand 105. In response to the detected positions and orientations of the user's hands 101, 105, the artificial reality system may position the virtual left hand 111 to also be to the lower-left of the virtual right hand 115. In addition, since the user's fingers 102, 103, 106, 107 are each in a neutral state, the corresponding virtual fingers 112, 113, 116, 117 may be shown and considered by the system to be in a neutral, relaxed state (i.e., neither extended nor bent).

Figure 1B:
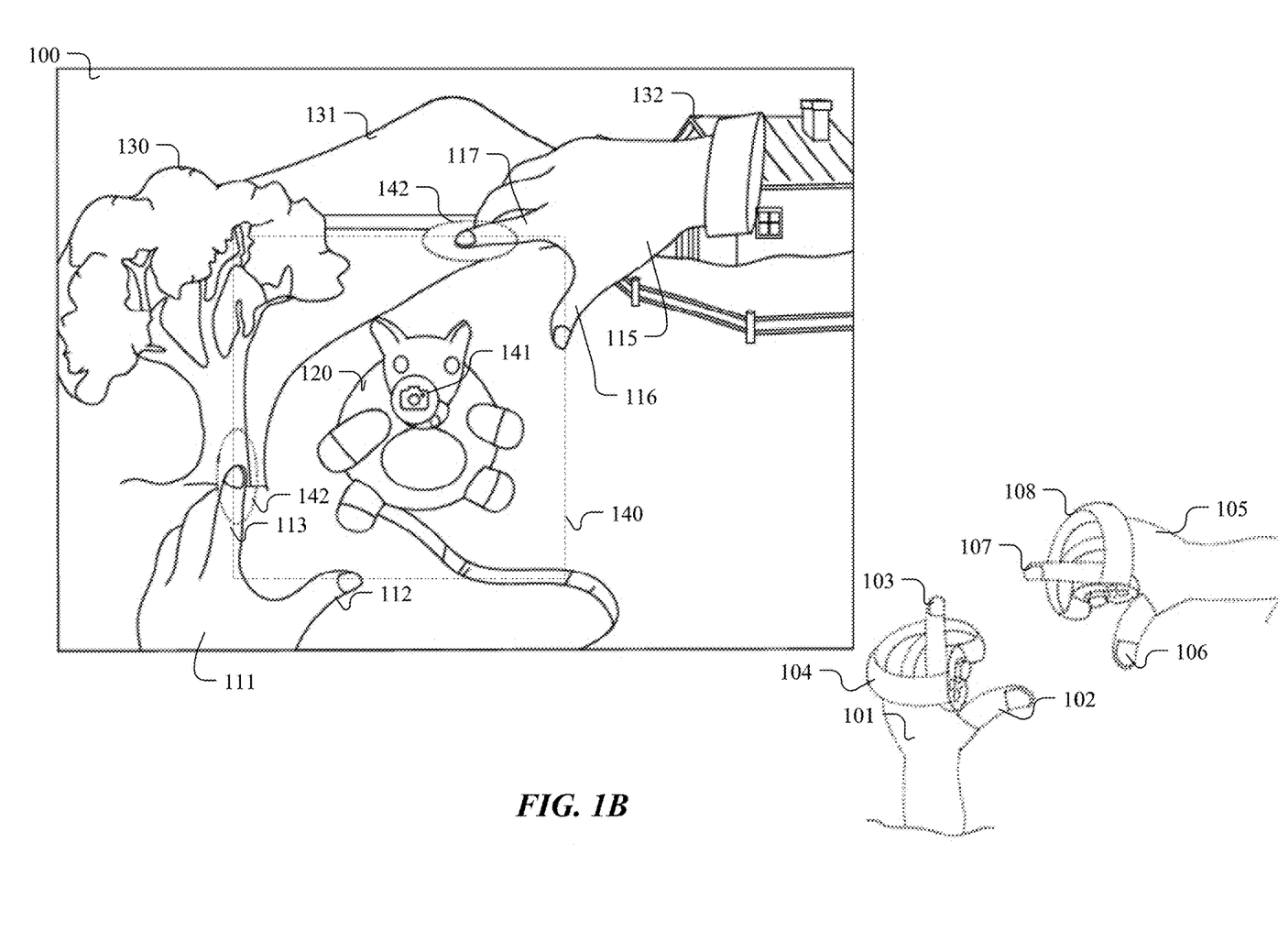

FIG. 1B illustrates the user identifying a region of interest using a hand gesture. Here, the user's left hand 101 is oriented with the back of the hand 101 facing the user, the extended index finger 103 is pointing upwards, and extended thumb 102 is pointing towards the user's right. The user's right hand 105 is oriented to the upper-right of the left hand 101. The back of the right hand 105 is facing the user, the extended index finger 107 is pointing to the left, and the extended thumb 106 is pointing downwards. The positions and orientations of the user's physically extended left thumb 102, left index finger 103, right thumb 106, and right index finger 107 form a frame (in this case a rectangular frame). When the user's fingers 102, 103, 106, 107 are extended as such, they are not touching the controllers 104, 106. In particular embodiments where the controllers 104, 106 have touch sensors, the artificial reality system would be able to detect that the user's fingers 102, 103, 106, 107 are not touching the controllers 104, 106 and consequently assume (even if incorrectly) that those fingers 102, 103, 106, 107 are extended. In embodiments where the controllers do not have touch sensors but only buttons, the system may assume that a finger is extended so long as it is not pressing the associated button (e.g., if a physical finger is resting on, but not pressing, a sensor-less button, the system would treat the virtual finger as extended for purposes of activating the picture-taking mode, even though in reality the finger may be bent). In response, the artificial reality system may configure the user's virtual hands 111, 115 and virtual fingers 112, 113, 116, 117 so that they correspond to their physical counterparts. As shown, the user's virtual fingers 112, 113, 116, 117 are extended to reflect the detected state of the user's real fingers 102, 103, 106, 107. As a result, the virtual hands 111, 115 and fingers 112, 113, 116, 117 would also form a frame 140 (the illustrated outline of the frame may or may not be made visible to the user) in the virtual environment. Through the frame 140 defined by his virtual hands 111, 115, the user can aim and select the portion of his view that he wishes to capture. By enabling the user to aim and frame a region of interest directly with his hands through a particular gesture, the system provides an intuitive, straightforward, and fast mechanism for the user to take a picture in artificial reality.

When the system detects that a frame 140 has been formed by the user's virtual hands 111, 115 and fingers 112, 113, 116, 117 in this manner, the system may, in particular embodiments, provide the user with visual cues to indicate that the picture-taking mode has been activated by the user's hand gesture. For example, the system may identify a location within the framed region 140 (e.g., its center, one of its corners, etc.) and display an icon 141 or any other visual cue while the frame 140 is formed by the hand gesture. As another example, portions of the user's virtual fingers may be presented with visual cues 142 (e.g., glowing or changing color, icons, animations, etc.) to inform the user that he may use those fingers to trigger the corresponding buttons, triggers, or any other input mechanisms of the controllers 104, 108 to take a picture of the framed region. In the example shown, the left virtual index finger 113 and the right virtual index finger 117 are shown with such visual cues 142 to signify to the user that the corresponding physical fingers 103 and 107 may be used to trigger an image capture.

Figure 1C:
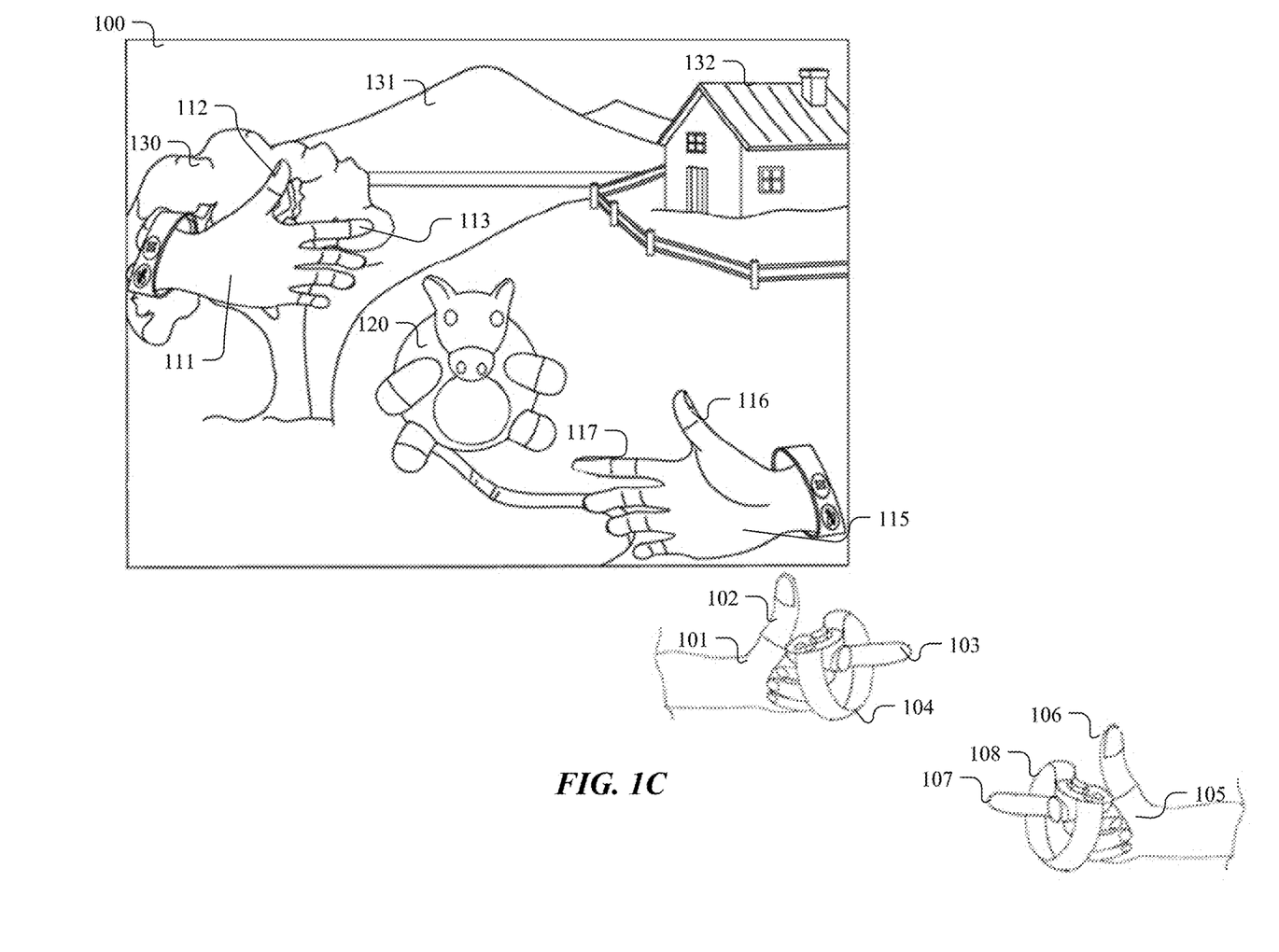

When the frame is no longer detected, the system may disengage the picture-taking mode and, consequently, cease displaying any visual cues. FIG. 1C illustrates such as example. As shown, the user's left index finger 103, left thumb 102, right index finger 107, and right thumb 106 continue to be extended. However, now those fingers 102, 103, 106, 107 no longer form a frame, as there is no upper frame boundary. The user's virtual hands 111, 115 and fingers 112, 113, 116, 117 mirror their physical counterparts, and as such no frame is detected. In particular embodiments, at the moment the frame is not detected, the system ceases to display the visual cues that indicate the enablement of the picture-taking mode (e.g., the icon 141 and visual cues 142 on the trigger fingers, as shown in FIG. 1B).

Figure 1D:
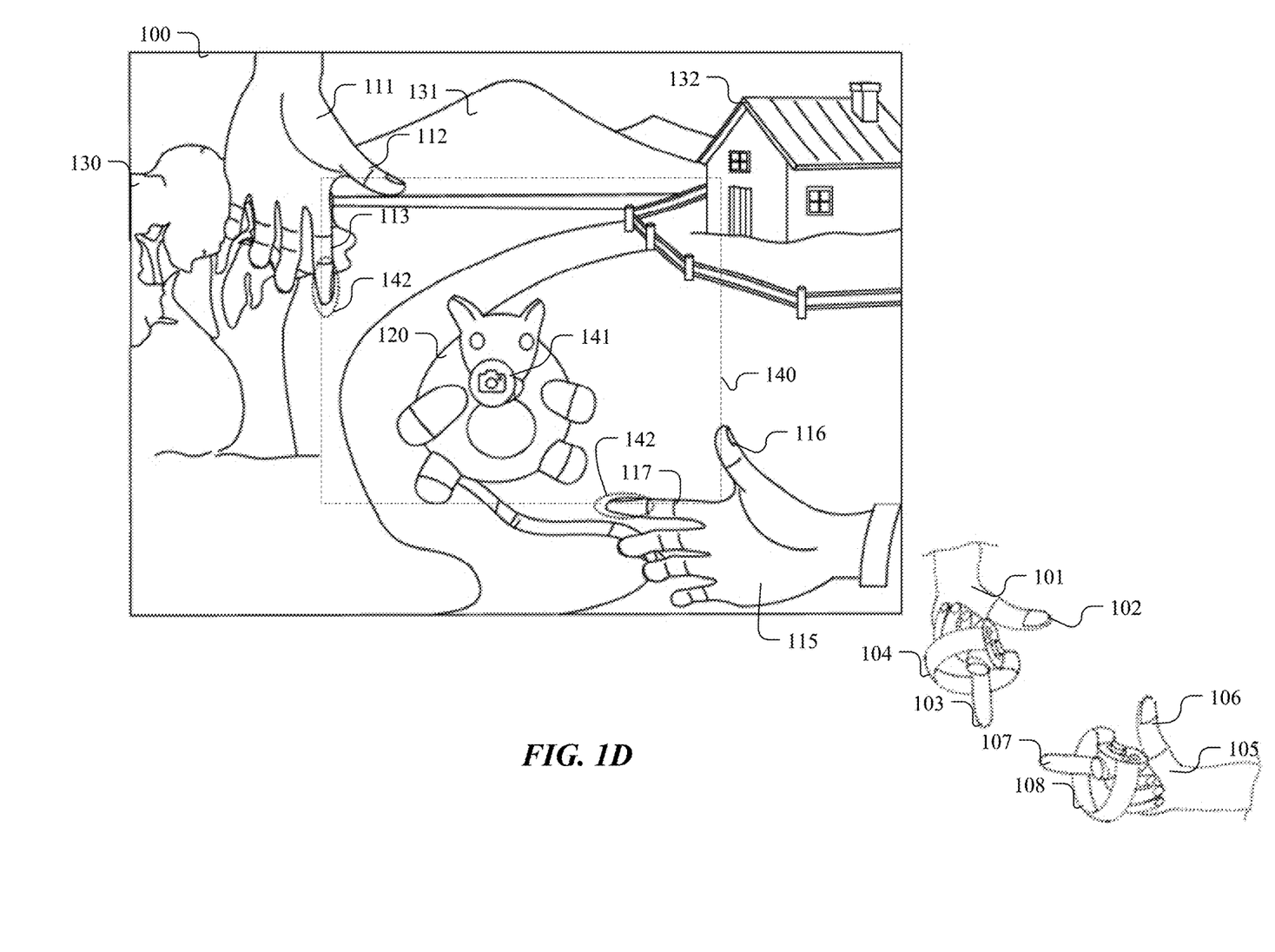

In particular embodiments, once the system again detects a user-defined frame, the picture-taking mode will again be enabled. FIG. 1D illustrates a scenario where the user again uses hand gestures to frame a region of interest. Similar to what was shown in FIG. 1B, the user's hand gesture in FIG. 1D defines a frame 140. The manner in which the frame 140 is defined, however, is different. In FIG. 1B, the top, bottom, left, and right frame borders of the frame 140 were defined by the virtual right index finger 117, the virtual left thumb 112, the virtual left index finger 113, and the virtual right thumb 116, respectively. Stated differently, the fingers 112, 113 of the left virtual hand 111 define the lower-left corner of the frame 140 and the fingers 116, 117 of the right virtual hand 115 define the upper-right corner of the frame 140. In contrast, in FIG. 1D, the configuration of the user's virtual hands 111, 115 are different from those shown in FIG. 1B. In particular, FIG. 1D shows the user's virtual palms facing the user and the virtual left hand 111 is positioned to the upper-left of the virtual right hand 115. The top, bottom, left, and right frame borders of the frame 140 are defined by the virtual left thumb 112, virtual right index finger 117, virtual left index finger 113, and virtual right thumb 116, respectively. Stated differently, the fingers 112, 113 of the left virtual hand 111 define the upper-right corner of the frame 140 and the fingers 116, 117 of the right virtual hand 115 define the lower-right corner of the frame 140. Upon detecting the frame 140, the system may again display the icon 141 and/or the visual cues 142 to indicate that the picture-taking mode has been enabled by the user's hand gesture.

As shown in these previous examples, particular embodiments may allow the user to define the frame using a variety of hand and finger configurations. In particular embodiments, the system may employ a set of rules to define valid hand and finger positions. As long as the rules for defining a frame are satisfied, the user may define a frame with any aspect ratio and size. In embodiments where the frame is a rectangle, the system may require each border of the frame to be defined by an extended finger. FIGS. 1B and 1D show examples where the virtual index fingers 113, 117 and thumbs 112, 116 were used to define different borders of the frame 140. Additionally or alternatively, the borders may be defined by the virtual index fingers 113, 117 and middle fingers (or any other fingers). In particular embodiments, any combination of extended virtual fingers may be used to define the frame (e.g., the virtual left thumb 102, virtual left middle finger, virtual right index finger 117, and virtual right middle finger). In particular embodiments, the palm of the virtual hands 111, 115 may both face the user, both face away from the user, or a combination of one palm facing the user and the other palm facing away from the user. The rules for triggering the picture-taking mode, stated differently, may be when the two virtual hand, via their respective fingers, define opposite corners of the frame 140. For example, in both FIGS. 1B and 1D, the left virtual hand 111 defines the lower-left corner of the frame (using the virtual left thumb 112 and index finger 113) and the right virtual hand 115 defines the upper-right corner of the frame (using the virtual right thumb 116 and index finger 117). In FIG. 1C, however, the left virtual hand 111 and right virtual hand 115 each defines a lower corner without the opposite upper corner being defined. Further, the hand that is defining the upper corner needs to be positioned higher relative to the hand that is defining the lower, opposite corner. For example, in FIG. 1D, if the virtual left hand 111, which is defining the lower-left corner, moves upwards so that it is positioned higher than the virtual right hand 115, then no frame would be defined even though the virtual right hand 115 is defining an upper-right corner.

Figure 1E:
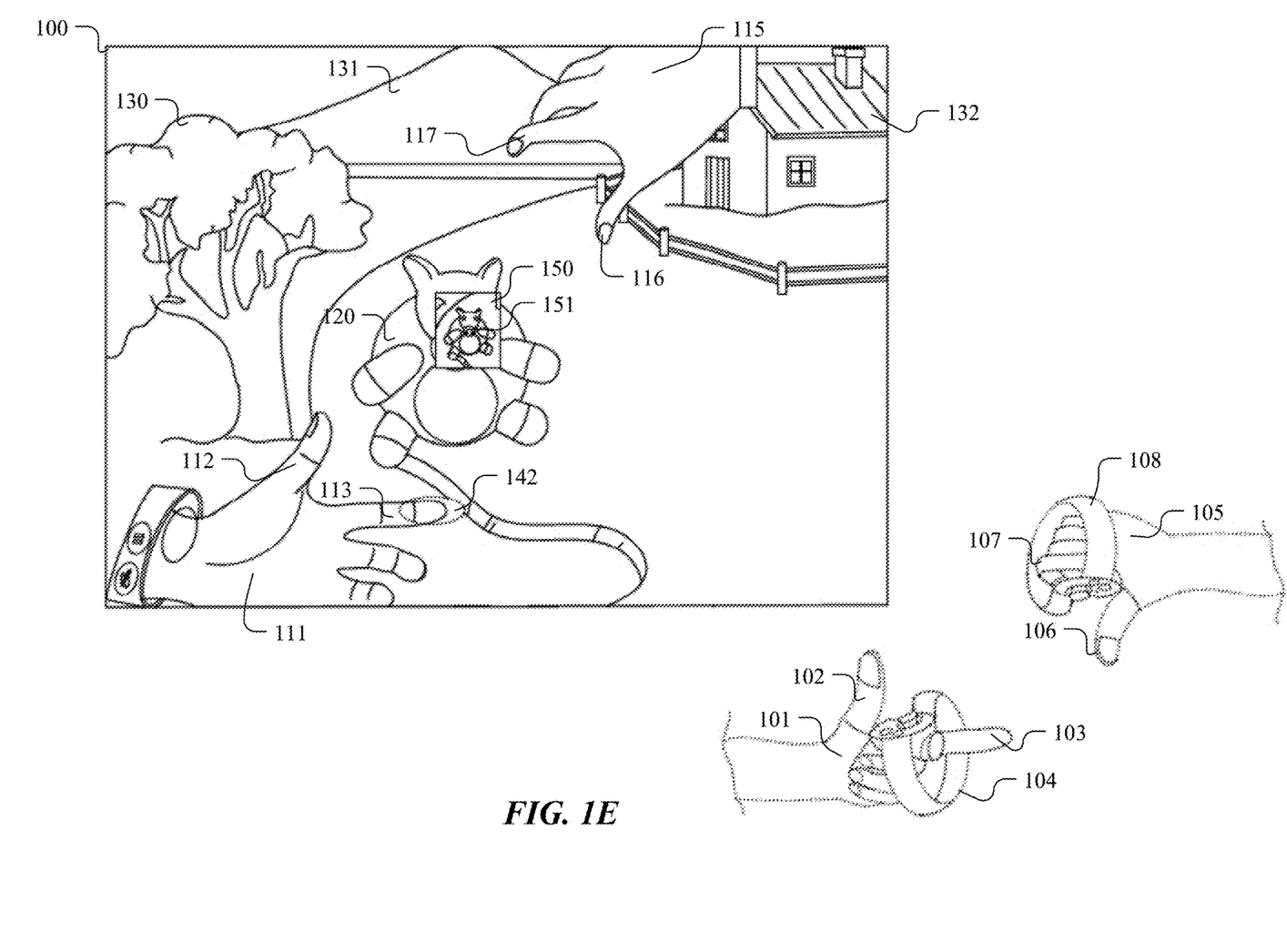

FIG. 1E illustrates an example of the user instructing the system to capture an image while the picture-taking mode is enabled. In particular, FIG. 1E shows the user using his right index finger 107 to press an associated button on the controller 108. In response to detecting the finger touching or pressing the button, the virtual right index finger 117 may be shown to bend. In addition, the system may capture a picture of the virtual environment 100 based on the field of view defined by the frame 140 (e.g., as shown in FIG. 1D). In particular embodiments, a small thumbnail image 150 of the captured image may then be displayed in the virtual environment 100. The thumbnail image 150 shown in FIG. 1E includes a captured view 151 of the virtual object 120.

When the user bends his finger to provide the image-capture command, the user's hand gesture may momentarily deviate from the expected gesture for the picture-taking mode (e.g., the user's hands may momentarily stop forming a frame). Thus, in particular embodiments, when the picture-taking mode is enabled, the system may wait for a predetermined amount of time (e.g., 0.5 seconds, 1 second, 2 seconds, etc.) after detecting that the hand gesture has been disengaged (e.g., no longer forming a frame) before exiting the picture-taking mode. For example, if the user presses the capture button and extends his finger again within 1 second, the system may perform the photo capture without exiting the picture-taking mode. On the other hand, if the user bends his finger for longer than 1 second, the system may end the picture-taking mode since the frame gesture is no longer being formed.

Figure 1F:
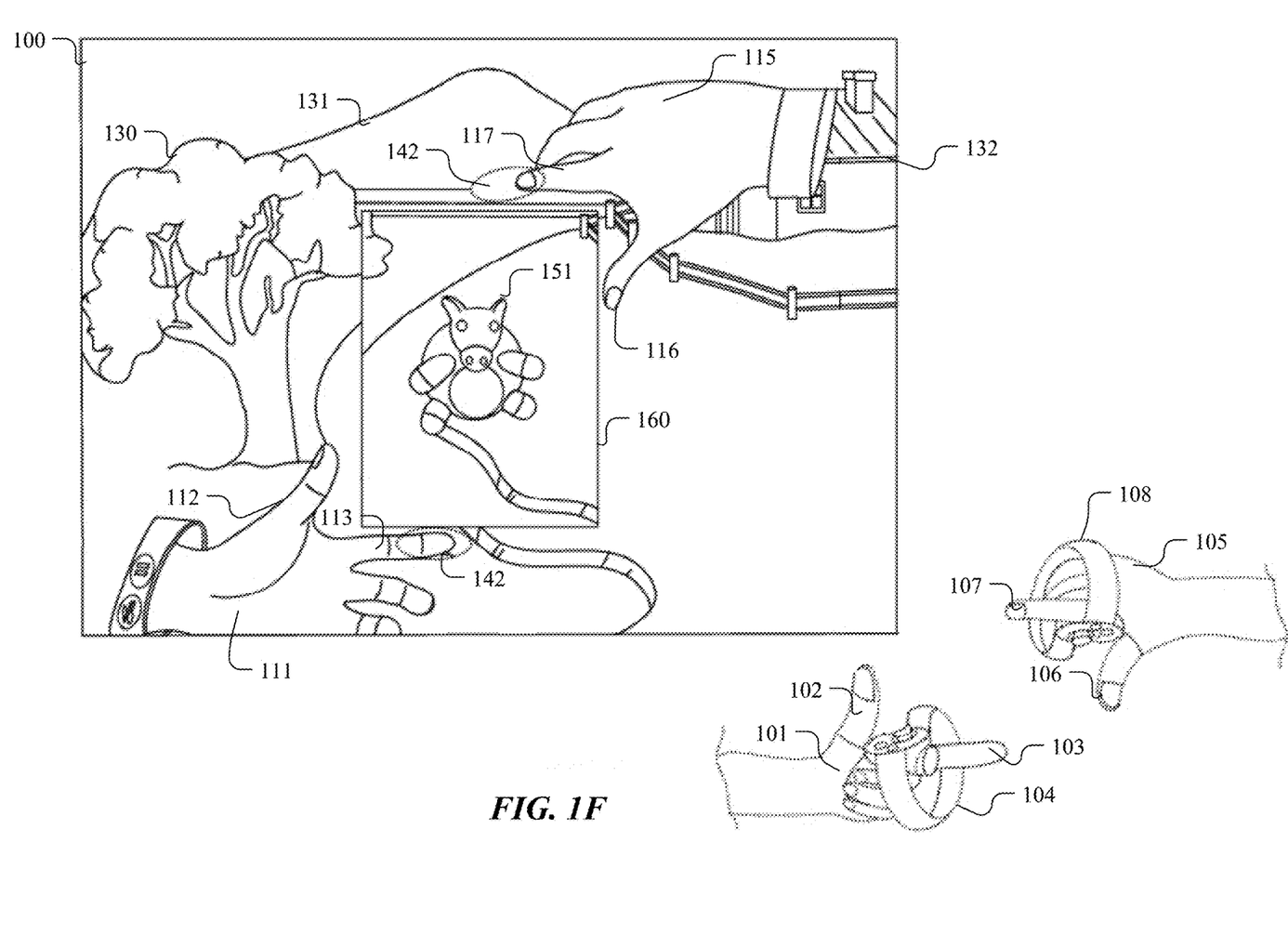

FIG. 1F illustrates an embodiment where the captured image 160 is displayed in a larger size. In particular embodiments, the captured image 160 may initially be displayed as a small thumbnail image 150, as shown in FIG. 1E, and grow in size until it reaches a predefined size, as shown in FIG. 1F. The captured image 160 shown in FIG. 1F includes the captured view 151 of the virtual object 120. In particular embodiments, the captured thumbnail 150 and/or image 160 may be aligned with the frame 140 associated with the capture. Thus, after an image is captured, the resulting thumbnail 150 and/or image 160 would be displayed within the area framed by the user's virtual hands 111, 115.

Figure 1G:
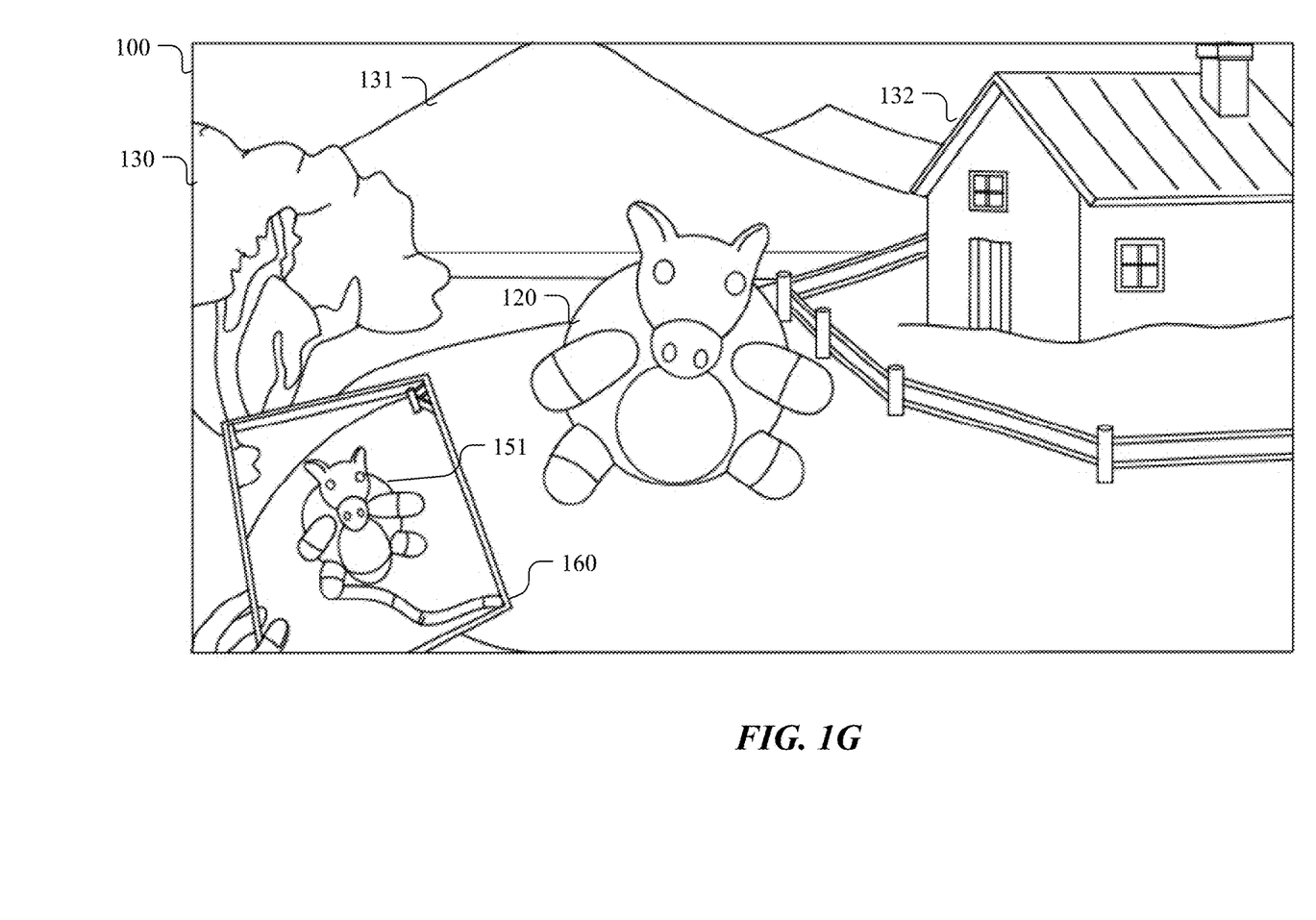

FIG. 1G illustrates an embodiment showing the captured image 160 becoming part of the virtual reality environment 100. After being captured, the image 160 may become a picture object in the virtual environment 100. As an object, the user may interact with it. For example, FIG. 1G shows the user holding the image 160 and moving it to a different location in the virtual environment 100. In particular embodiments, the user may resize it (e.g., by holding onto different sides or corners of the image 160 and moving the hands apart to enlarge or together to shrink the image 160). In particular embodiments, the user may also give the picture to other users sharing the same virtual environment 100 by, for example, physically handing the picture 160 to another user, pinning or leaving the picture 160 in the virtual environment 100 for others to find, sending (e.g., via e-mail, texting, or instant messaging) the picture 160, or sharing or posting the picture 160 on a social-networking platform.

In addition to pictures, embodiments disclosed herein may also enable a user of an artificial reality system to quickly and intuitively capture videos of what the user is seeing. Similar to what was described above, the user may frame a scene of interest using hand gestures. Detection of the appropriate gestures may trigger an image/video capture mode, during which the user may either capture images or videos. Particular embodiments may allow a user to capture an image by pressing a button or bending his/her finger once (e.g., through a press-and-release motion). To capture a video, the user may instead press and hold down the capture button. In particular embodiments, the system may continue to record the video until the user releases the button. Particular embodiments may also cease recording when the user's gesture for framing the scene of interest is disengaged or becomes invalid.

Figure 2:
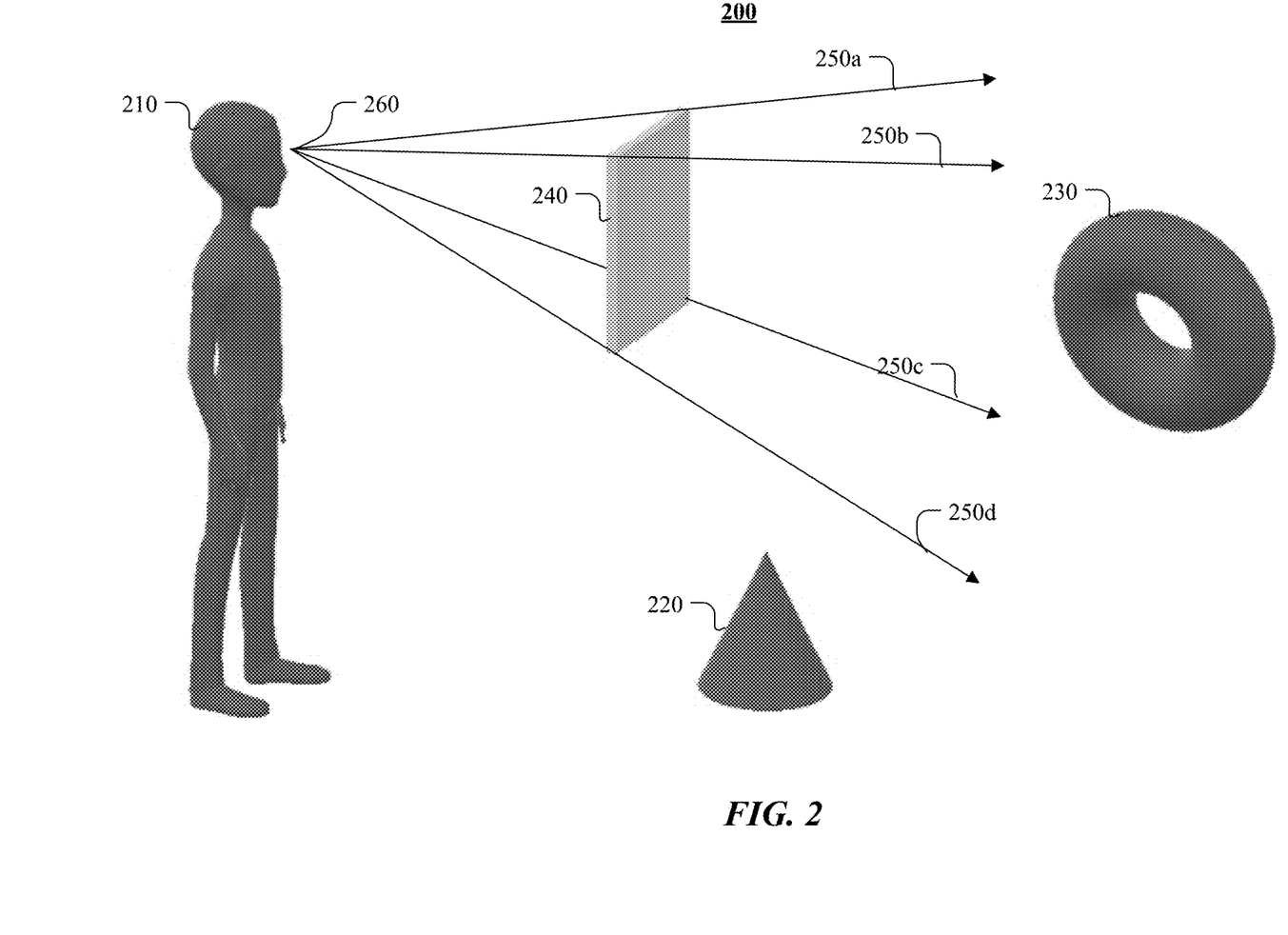
FIG. 2 illustrates an example of a picture being taken in artificial reality based on a frame defined by a user.

The frame defined by the user's hand gestures and the viewpoint of the user in the virtual environment may be used to render the desired picture or video frame. FIG. 2 illustrates an embodiment for taking a picture in a virtual reality environment 200. In the example shown, the virtual reality environment 200 includes a virtual representation of a user 210, a virtual cone-shaped object 220, and a virtual torus-shaped object 230. Although only a couple objects are provided in this example, it should be understood that the virtual reality environment 200 may include any number of objects, including background objects and avatars representing other users that are concurrently present in the virtual reality environment 200. In particular embodiments, while the picture-taking mode is activated, the user 210 may provide an input indicating a desire to take a picture (e.g., by pressing a button, issuing a voice command, blinking for the eye tracker, or any other input mechanism). In response to the input, the system may determine the position, orientation, and size of the frame 240 based on the user's hand gesture, as described in more detail elsewhere herein. The frame 240 may be invisible to the user 210 and used only for computational purposes, or it may be made visible to the user 210 as a translucent surface or outline to provide the user 210 with visual framing guidance. Based on the user-defined frame 240, the system may render an image of the desired scene as seen by the user 210 through the frame 240. Thus, in particular embodiments, the system may determine the position of the user's 210 viewpoint 260 in the virtual reality environment 200 and project rays, such as the representative rays 250*a-d*, from that viewpoint 260 and through the frame 240. In this manner, the system may determine what virtual objects are visible through the frame 240 from the user's viewpoint 260. In the example shown, the torus object 230 is visible from the user's 210 viewpoint 260 but not the cone object 220. As such, the picture that is generated would capture a view of the torus object 230 from the viewpoint 260, but the cone object 220 would not be visible.

Another example of how the system may capture an image based on the user-defined frame is as follows. When a frame is detected and the picture-taking mode is enabled, the system may place a virtual camera (which represents the user's viewpoint) at the position of the user's headset within the virtual environment and turn the camera towards the center of the frame. Based on the relative positions and orientations between the virtual camera and the frame, the system may calculate the aspect ratio and field of view and apply them to the virtual camera and its target render texture. The virtual camera may then be used to extract a rendered image at the desired dimensions.

In particular embodiments, the resolution of the taken picture, which may correspond to the number of ray used for sampling, may be predetermined. In particular embodiments, the resolution of the picture may be set to be higher than the resolution of the virtual reality environment 200. For example, even if the virtual reality environment 200 is displayed to the user in standard-definition resolution, the picture that is taken of the environment 200 need not be limited to such resolution and could instead be high-definition or ultra-high definition, depending on the density of the rays desired. Thus, even if the standard display of the scene is mediocre, the quality of the captured scene may be significantly better. By decoupling any resolution dependency between the virtual reality environment 200 and pictures thereof, the picture quality is not limited to the resolution of the virtual reality environment 200 and the virtual reality environment 200 could be generated at the optimal resolution for the given hardware/processing resources of the system without impacting picture quality. In other embodiments, the captured picture may be generated based on a crop of the existing, already-rendered view of the virtual reality environment 200. Although this embodiment may sacrifice picture quality, it has the advantage of not incurring any additional processing cost and improved speed, which may be the preferred tradeoff for systems with limited processing resources.

Particular embodiments may further provide a zoom feature. In particular embodiments where the resolution used for capturing a picture (which may all be at a set size of x-by-y pixels) is set to a particular value regardless of the size of the frame 240, the user 210 may effectively zoom in and out of a scene by adjusting the size and/or position of the frame 240. For example, if the number of rays to be cast is fixed, the density of rays going through a frame 240 positioned closer to the user's viewpoint 260 would be sparser (e.g., due to the wider field of view) than the density of rays going through the same frame 240 positioned farther away (e.g., due to the narrower field of view). Similarly, the ray density for a smaller frame 240 would be higher than that of a larger frame 240 at the same position, assuming the same number of rays will be projected. As a result, the higher sampling density would effectively generate a picture (e.g., with x-by-y dimensions) that is zoomed into the region of interest as defined by the frame 240. Through this feature, the user 210 may intuitively zoom in by pushing his hands (and the corresponding frame 240) farther away from his viewpoint 260 and zoom out by placing his hands (and the corresponding frame 240) closer to his viewpoint 260.

In particular embodiments, to provide the user with real-time feedback of what a picture would look like, the system may display a preview of the picture while the picture-taking mode is enabled. Thus, as the user is configuring his hands to determine how best to frame a scene, the user would be presented with, in real-time, what the picture would look like if it is taken at that moment. In particular embodiments, once the system determines that the picture-taking mode has been enabled based on the user's hand gestures, it may begin to cast rays through the user-defined frame to render a preview of the picture in real time. The preview may be shown within the frame, between the user's virtual hands. Thus, if the picture has a higher resolution than the virtual reality environment, the framed region would appear to have higher resolution than the rest of the scene. In particular embodiments, the preview may be presented with a visual border to signify to the user that the region within the border is a preview of what the picture-taking feature would generate. In addition to providing real-time feedback, the preview feature has the added benefit of ameliorating problems associated with picture aiming through different eyes. Since the frame defined by the user's hands is fairly close to the user's viewpoint, the framed scene as seen through the user's right eye may look different from what is seen through the user's left eye. As a result, if the system is configured to cast rays from the user's right-eye position to generate the picture, the resulting picture may look different for a user who was actually aiming with his left eye. By providing a preview of the picture (which may be generated from the user's right-eye position), there would be no discrepancy between what the user expected to capture and what is ultimately captured in the picture.

Figure 3:
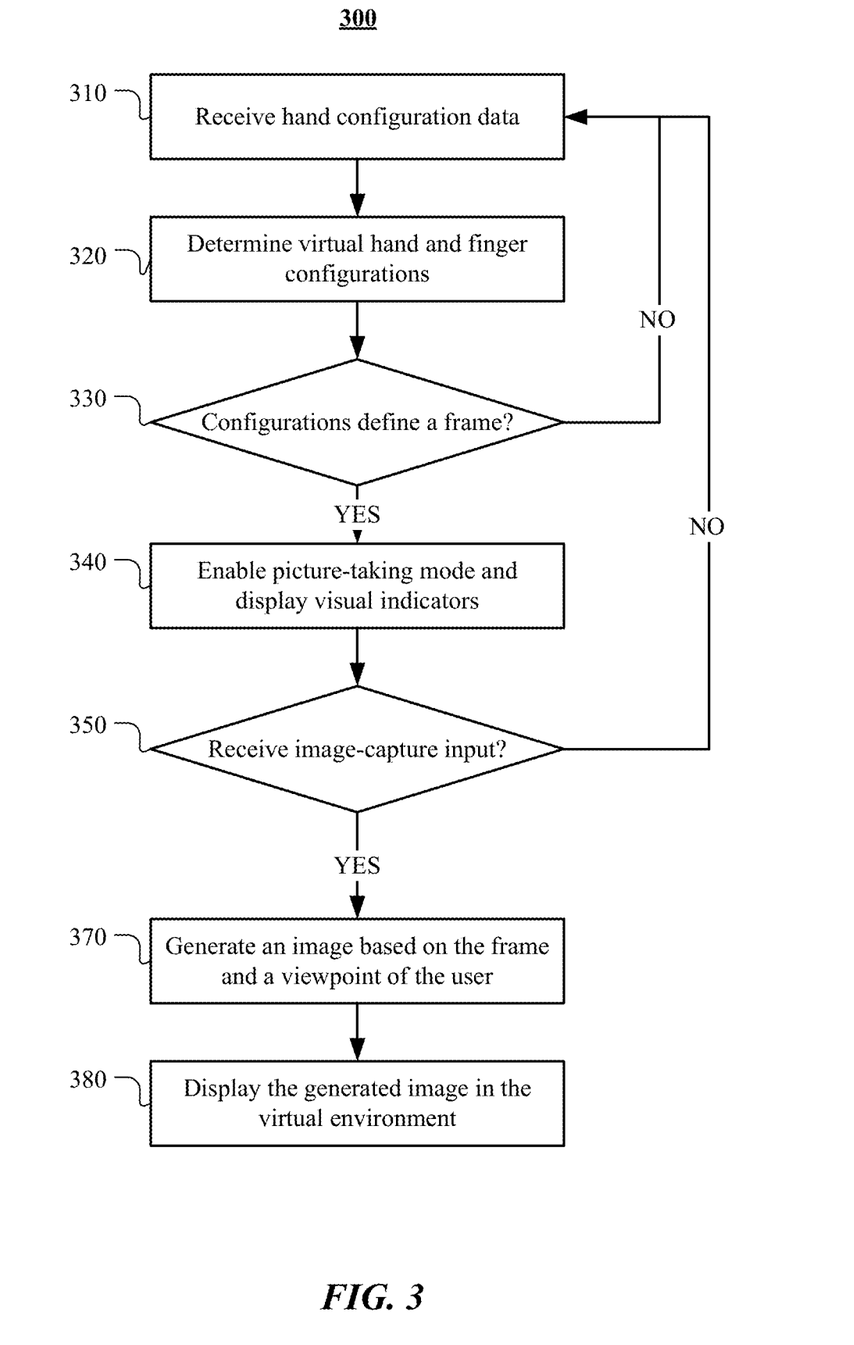
FIG. 3 illustrates a method for taking a picture in artificial reality according to particular embodiments.

FIG. 3 illustrates an example method 300 for enabling a user to take pictures within a virtual reality environment. The method may begin at step 310, where a computing system may receive hand configuration data associated with a user of an artificial reality application. As previously described, the hand configuration data may be received from controllers (e.g., controllers 104 and 108 in FIG. 1A) or other types of body and motion tracking devices associated with the computing system. For example, the configuration data may include the relative positions and orientations of the user's physical hands and fingers.

At step 320, the system may determine, based on the hand configuration data, that a first left finger and a second left finger of a virtual left hand of the user and a first right finger and a second right finger of a virtual right hand of the user are extended. For example, in FIG. 1B, the system determined that the user's virtual left index finger 113, virtual left thumb 112, virtual right index finger 117, and virtual right thumb 116 are extended. Whether or not a virtual finger is treated as being extended depends on the criteria used and may or may not reflect the physical state of the corresponding finger. For example, FIG. 1B illustrates controllers 104, 108 with touch sensors. Through the touch sensors, the system may know whether the user's index fingers and thumbs are touching the controllers. If those fingers are not touching the controllers, the system may treat that as an indication that the fingers are extended (even though in reality the fingers may or may not be fully extended). Conversely, if those fingers are touching the controllers, the system may treat them as being bent for purposes of determining the frame and whether to enable the picture-taking mode. If instead the controllers do not have touch sensors, the criteria for determining whether a finger is extended may be based on whether that finger is pressing an associated button designed for that finger. Thus, so long as the button is not pressed, the system may treat the corresponding virtual finger as being in an extended state for purposes of determining the frame and whether to enable the picture-taking mode. In embodiments where computer vision is employed, the system may instead determine the configurations of the user's hands and fingers (e.g., whether particular fingers, such as the thumbs and index fingers, are extended) based on object-tracking (in this case, hand and finger tracking) image processing algorithms.

At step 330, the system may determine whether the virtual hands' configuration defines a frame. In particular embodiments, the system may determine that a frame has been formed when a predetermined geometric pattern (e.g., a quadrilateral, triangle, oval, circle, etc.) is formed by the virtual hands. For example, the system may determine whether the aforementioned first and second left fingers and the first and second right fingers define a quadrilateral in the virtual environment. Each side of the quadrilateral (e.g., a rectangle, square, etc.) may be defined by one of the fingers, so that the first left finger and the second left finger define a first corner of the quadrilateral and the first right finger and the second right finger define an opposite corner of the quadrilateral.

In particular embodiments, the rules for determining whether a frame has been formed may allow for certain margins of error. Since the frame is expected to be defined manually by the user's hands, it is likely that the user's hands would not precisely form a perfect quadrilateral. As such, the rules may be defined in such a manner that, so long as the required finger alignments are within predefined thresholds, the system would consider the fingers to be defining a frame. For example, one rule may specify that that the four extended virtual fingers used for defining a frame need to be sufficiently within the same plane. The two left-hand fingers may define a left-hand plane and the two left-hand fingers may define a right-hand plane. The particular rule requiring the fingers to be sufficiently in the same plane may be satisfied if the distance and rotational angle between the left-hand plane and the right-hand plane are within threshold amounts (e.g., the distance between the planes is within 0.5, 1, or 3 centimeters, and the difference in rotational angle is within 1, 2, or 5 degrees). In addition to requiring the fingers to be sufficiently within the same plane, the rules may require the left-hand fingers and the right-hand fingers to define opposite corners of the quadrilateral. Ideally, the two fingers of each hand would form a 90-degree corner, but the rules may allow for a threshold margin of error (e.g., within plus or minus 1, 3, or 5 degrees of 90 degrees). The rules may further require opposite sides of the frame to be sufficiently parallel to one another within a threshold margin of error (e.g., to be parallel to each other, the degree between the two sides is ideally 0, but the rules may allow for plus or minus 1, 2, or 5 degrees of 0 degree).

In particular embodiments, the system may decide whether to enable the picture-taking mode based on the determination of whether a frame is formed. If the system determines that the user's current hand and finger configurations do not define a frame, it may not enable the picture-taking mode and repeat the process of receiving and processing hand configuration data until the desired gesture has been detected. On the other hand, if the system determines that a frame is formed, the system may proceed with enabling the picture-taking mode at step 340. As previously discussed, while the picture-taking mode is enabled, the system may display certain visual cues to the user to indicate that the picture-taking mode has been enabled. In particular embodiments, upon enabling the picture-taking mode, the system may also cast rays through the defined frame to generate a preview.

At step 350, the system may listen for a user input that indicates a desire to capture an image. In particular embodiments, if no such input is detected, the system may repeat the process from step 310 and again determine whether the picture-taking mode should continue to be enabled. Thus, as soon as the user ceases to define a frame, the picture-taking mode would be disabled, until the frame is detected once again. If the user indicates a desire to capture a picture while the picture-taking mode is enabled, the system may proceed with capturing an image based on the defined frame. In particular embodiments, when the picture-taking mode is enabled, the system may wait for a predetermined amount of time (e.g., 0.5 seconds, 1 second, 2 seconds, etc.) after detecting that the hand gesture has been disengaged (e.g., no longer forming a frame) before exiting the picture-taking mode. For example, if the user presses the capture button and extends his finger again within 1 second, the system may perform the photo capture without exiting the picture-taking mode. On the other hand, if the user bends his finger for longer than 1 second, the system may end the picture-taking mode since the frame gesture is no longer being formed.

At step 370, the system may generate, based on the user-defined frame (which may be a quadrilateral) and a viewpoint of the user in the virtual environment, an image that captures a scene in the virtual environment. In particular embodiments, the viewpoint of the user may coincide with the user's left-eye, right-eye, or the point between his left and right eyes in the virtual environment. The rays may be projected from the viewpoint, through the defined frame, and into the virtual environment to sample the three-dimensional virtual world and determine what is visible. In other embodiments, when a frame is detected and the picture-taking mode is enabled, the system may place a virtual camera at the position of the user's headset within the virtual environment and turn the camera towards the center of the frame. Based on the relative positions and orientations between the virtual camera and the frame, the system may calculate the aspect ratio and field of view and apply them to the virtual camera and its target render texture. The virtual camera may then be used to extract a rendered image at the desired dimensions. At step 380, the system may display the generated image in the virtual environment.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for enabling a user to take pictures within a virtual reality environment, including the particular steps of the method of FIG. 3, this disclosure contemplates any suitable method for doing so, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
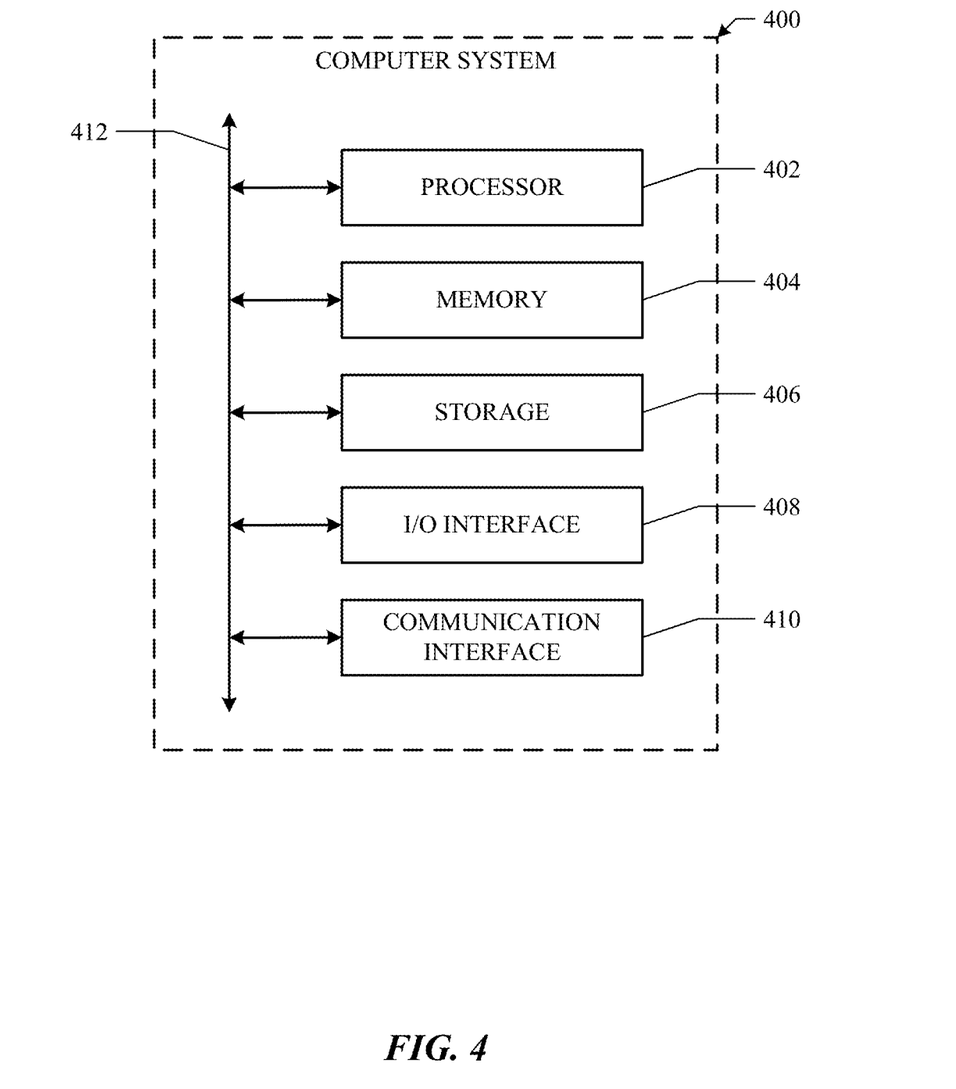
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   rendering, at a first-time instance, a visual scene comprising at least one virtual object, the visual scene being rendered at a first resolution;
   displaying the visual scene to a user using a headset worn by the user;
   receiving, at the first-time instance, hand configuration data associated with the user;
   determining a frame defined by the hand configuration data;
   determining, via one or more sensors associated with the headset worn by the user, a viewpoint of the user;
   projecting rays from the viewpoint of the user through the frame defined by the hand configuration data;
   generating an image of a portion of the visual scene at a second resolution higher than the first resolution of the visual scene comprising the virtual object based on a density of rays projected through the frame defined by the hand configuration data, wherein the generated image of the portion of the visual scene becomes part of the visual scene at a same time instance at which the visual scene is currently rendered; and
   re-rendering the visual scene with the generated image of the portion of the visual scene, wherein in response to re-rendering, displaying simultaneously, using the headset, (1) a preview of the generated image of the portion of the visual scene at the second resolution at the first-time instance and (2) the visual scene at the first resolution at the first-time instance.

2. The method of claim 1, wherein the determining of the frame defined by the hand configuration data further comprises:
   determining that a first left finger, a second left finger, a first right finger, and a second right finger are substantially aligned, within a predetermined threshold, in a plane of the visual scene determined by the frame.

3. The method of claim 1, wherein the determining of the frame defined by the hand configuration data comprises:
   determining, based on the hand configuration data, that a first left finger, a second left finger, a first right finger, and a second right finger of the user are extended, wherein the hand configuration data indicate that corresponding fingers of the user are not touching hand-held controllers of the computing system.

4. The method of claim 3, wherein the first left finger, the second left finger, the first right finger, and the second right finger correspond, respectively, to the user's left index finger, left thumb, right index finger, and right thumb.

5. The method of claim 1, further comprising:
   in response to the determination that the frame is defined by the hand configuration data, displaying a visual indicator indicating that a picture-taking mode is enabled.

6. The method of claim 1, further comprising:
   receiving an input from the user after the determination that the frame is defined by the hand configuration data;
   wherein the image is generated in response to the input.

7. The method of claim 6, wherein the input is triggered by fingers of the user that are used to define the frame.

8. One or more computer-readable non-transitory storage media embodying software that is operable when executed to:
   render, at a first-time instance, a visual scene comprising at least one virtual object, the visual scene being rendered at a first resolution;
   display the visual scene to a user using a headset worn by the user;
   receive, at the first-time instance, hand configuration data associated with the user;
   determine a frame defined by the hand configuration data;
   determine, via one or more sensors associated with the headset worn by the user, a viewpoint of the user;
   project rays from the viewpoint of the user through the frame defined by the hand configuration data;

generate an image of a portion of the visual scene at a second resolution higher than the first resolution of the visual scene comprising the virtual object based on a density of rays projected through the frame defined by the hand configuration data, wherein the generated image of the portion of the visual scene becomes part of the visual scene at a same time instance at which the visual scene is currently rendered; and re-render the visual scene with the generated image of the portion of the visual scene, wherein in response to re-rendering, display simultaneously, using the headset, (1) a preview of the generated image of the portion of the visual scene at the second resolution at the first-time instance and (2) the visual scene at the first resolution at the first-time instance.

9. The media of claim 8, wherein when determining the frame defined by the hand configuration data, the software is further operable when executed to:

determine that a first left finger, a second left finger, a first right finger, and a second right finger are substantially aligned, within a predetermined threshold, in a plane of the visual scene determined by the frame.

10. The media of claim 8, wherein when determining the frame defined by the hand configuration data, the software is further operable when executed to:

determine, based on the hand configuration data, that a first left finger, a second left finger, a first right finger, and a second right finger are extended, the hand configuration data indicating that corresponding fingers of the user are not touching hand-held controllers.

11. The media of claim 10, wherein the first left finger, the second left finger, the first right finger, and the second right finger correspond, respectively, to the user's left index finger, left thumb, right index finger, and right thumb.

12. The media of claim 8, wherein the software is further operable when executed to:

in response to the determination that the frame is defined by the hand configuration data, display a visual indicator indicating that a picture-taking mode is enabled.

13. The media of claim 8, wherein the software is further operable when executed to:

receive an input from the user after the determination that the frame is defined by the hand configuration data;

wherein the image is generated in response to the input.

14. A system comprising:

one or more processors; and one or more computer-readable non-transitory storage media coupled to one or more of the processors and comprising instructions operable when executed by one or more of the processors to cause the system to:

render, at a first-time instance, a visual scene comprising at least one virtual object, the visual scene being rendered at a first resolution;

display the visual scene to a user using a headset worn by the user;

receive, at the first-time instance, hand configuration data associated with the user;

determine a frame defined by the hand configuration data;

determine, via one or more sensors associated with the headset worn by the user, a viewpoint of the user;

project rays from the viewpoint of the user through the frame defined by the hand configuration data;

generate an image of a portion of the visual scene at a second resolution higher than the first resolution of the visual scene comprising the virtual object based on a density of rays projected through the frame defined by the hand configuration data, wherein the generated image of the portion of the visual scene becomes part of the visual scene at a same time instance at which the visual scene is currently rendered; and re-render the visual scene with the generated image of the portion of the visual scene, wherein in response to re-rendering, display simultaneously, using the headset, (1) a preview of the generated image of the portion of the visual scene at the second resolution at the first-time instance and (2) the visual scene at the first resolution at the first-time instance.

15. The system of claim 14, wherein when determining the frame defined by the hand configuration data, the processors are further operable when executing the instructions to:

determine that a first left finger, a second left finger, a first right finger, and a second right finger are substantially aligned, within a predetermined threshold, in a plane of the visual scene determined by the frame.

16. The system of claim 14, wherein when determining the frame defined by the hand configuration data, the processors are further operable when executed to:

determine, based on the hand configuration data, that a first left finger, a second left finger, a first right finger, and a second right finger are extended, the hand configuration data indicating that corresponding fingers of the user are not touching hand-held controllers.

17. The system of claim 16, wherein the first left finger, the second left finger, the first right finger, and the second right finger correspond, respectively, to the user's left index finger, left thumb, right index finger, and right thumb.

18. The system of claim 14, wherein the processors are further operable when executing the instructions to:

in response to the determination that the frame is defined by the hand configuration data, display a visual indicator indicating that a picture-taking mode is enabled.

19. The system of claim 14, wherein the processors are further operable when executing the instructions to:

receive an input from the user after the determination that the frame is defined by the hand configuration data;

wherein the image is generated in response to the input.

* * * * *